April 21, 1964 TSUNEO ARAKI ETAL 3,130,137

MANUFACTURE OF SELENIUM RECTIFIER CELL

Filed Sept. 27, 1960

Inventors
T. ARAKI
S. IMAI
By C. H. Suydam
AGENT

United States Patent Office 3,130,137

Patented Apr. 21, 1964

3,130,137

MANUFACTURE OF SELENIUM RECTIFIER CELL

Tsuneo Araki and Shuzaburo Imai, Tokyo, Japan, assignors to Nippon Electric Company, Limited, Tokyo, Japan, a corporation of Japan Filed Sept. 27, 1960, Ser. No. 58,826
Claims priority, application Japan Oct. 14, 1959
5 Claims. (Cl. 204—43)

This invention relates to a method of manufacturing base plate for selenium rectifier cells. The method is characterized by coating the metal base plate surface with a nickel selenide layer by an electroplating process before applying the selenium layer thereto.

The object of the invention is to decrease the electrical resistance between the base plate and selenium layer thereby decreasing the forward resistance of the selenium cell.

In manufacturing a selenium rectifier cell various methods have been tried in order to decrease the contact resistance between the metallic base plate and the selenium layer. For this purpose nickel-plating the base plate has long been practiced. Even now it is a widely adopted method, but it does not prevent the difficulty caused by the oxide film created on the nickel plated surface. An alternative method has been tried by forming a thin bismuth layer on the base plate. However, this method could not fully reduce the resistance. On the other hand, it has been discovered that, if a nickel selenide layer is formed on the base plate, the resistance is greatly reduced.

This invention is characterized by forming the nickel selenide layer simply and surely by electroplating. An example embodying the features of this invention is shown below.

Figure 1:
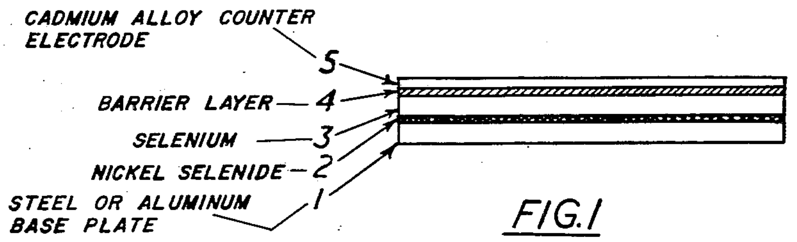
Figure 2:
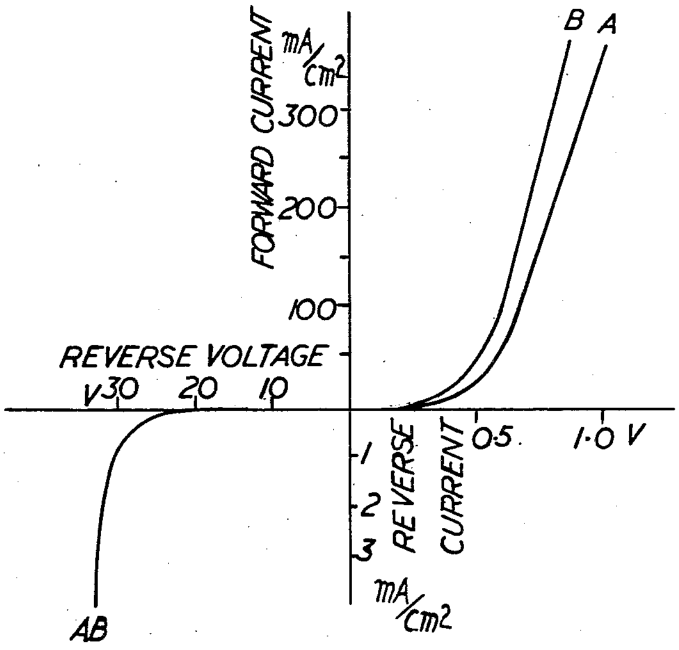

FIG. 1 shows a magnified cross-section of a selenium rectifier cell embodying the features of this invention; and FIG. 2 shows the characteristics comparing the said selenium rectifier with the conventional one.

As shown in FIG. 1, numeral 1 is a metal plate, such as one formed from a steel or aluminum, which is usually used as a base plate for a selenium rectifier cell. The surface of the base plate 1 is roughened by chemical etchings or sand blasting. Then the plate is dipped into a solution containing nickel and selenium compounds thereby electroplating it as a cathode. An example of the composition of the solution used for electroplating and its electroplating condition is shown as follows.

The composition of the solution:

| | |
|---|---|
| Nickel chloride | 50 grams. |
| Selenium dioxide | 200 grams. |
| Water | 1 liter. |
| pH | 1.5. |

Electroplating condition:

| | |
|---|---|
| Electroplating temperature | 50° C.–80° C. |
| Current density | 0.1 a./dm.$^2$. |
| Anode | Carbon electrode or sintered nickel selenide. |
| Electroplating time | 3 minutes. |

After being completely electroplated, the base plate is washed by water, and dried well in a hot-air drying oven or annealed, and upon it the selenium layer is applied in a conventional manner. The step of applying the selenium layer may be any of those described in "Selengleichrichter," pp. 37–63, written by G. Mierdel and J. Kroczek and published in 1959 by VEB Verlag Technik, Berlin (Germany). By performing either the hot-press process or the high vacuum evaporation process, the selenium layer 3 is applied to the nickel selenide layer 2, which has been prepared by the above electroplating method. Then the selenium layer is crystallized by one or more heat treatments. The barrier layer material 4 is then applied. The step of barrier forming and the material therefor may be any one of those taught in the cited "Selengleichrichter," pp. 52–55. After the barrier layer 4 has thus been formed, for example, by spraying, the cadmium alloy 5 is also applied as a counter electrode. The rectifier is then heat-treated and formed in the conventional manner to increase the reverse voltage-current characteristic, e.g., by passing current through the rectifier in the reverse direction.

Thus, the selenium rectifier cell is completed. The method of manufacturing a selenium rectifier cell by the above method as compared with the conventional method reduces the forward resistance without materially affecting the reverse voltage-current characteristic. It also provides a simple manufacturing operation resulting in uniform products.

By comparing, with reference to FIG. 2, the rectifying characteristics shown by curve B of the selenium rectifier cell obtained by either of the above described methods with that shown by curve A of a cell obtained by the conventional method, it will be seen that, although no difference is noticed in the reverse voltage-current characteristic, it is obvious that of the forward characteristic is remarkably improved.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. The method of manufacturing a base plate for a selenium rectifier cell comprising the steps of electroplating a metal base plate in an aqueous solution of significant amounts of a nickel salt and selenium dioxide with the base plate forming the cathode whereby a nickel selenide layer is formed on said base plate.

2. The method of manufacturing a base plate for a selenium rectifier cell comprising the steps of electroplating a metal base plate in an aqueous solution of nickel chloride and selenium dioxide in the approximate ratio of 1 to 4 by weight, at a temperature between 50° C. and 80° C. with the base plate forming the cathode whereby a nickel selenide layer is formed on said base plate.

3. The method of manufacturing a base plate as claimed in claim 2 including the step of forceably drying the electroplated metal base plate.

4. The method of manufacturing a base plate as claimed in claim 2 in which the metal base plate is aluminum.

5. The method of manufacturing a base plate as claimed in claim 2 in which the metal base plate is steel.

References Cited in the file of this patent

UNITED STATES PATENTS

| | | |
|---|---|---|
| 1,818,579 | Pfleiderer | Aug. 11, 1931 |
| 2,408,116 | Von Hippel | Sept. 24, 1946 |
| 2,866,740 | Reid | Dec. 30, 1958 |